United States Patent [19]

Genrich

[11] Patent Number: 4,514,696
[45] Date of Patent: Apr. 30, 1985

[54] NUMERICALLY CONTROLLED OSCILLATOR

[75] Inventor: Thad J. Genrich, Mesa, Ariz.

[73] Assignee: Motorola, Inc., Schaumburg, Ill.

[21] Appl. No.: 453,371

[22] Filed: Dec. 27, 1982

[51] Int. Cl.³ .......................... H03B 27/00; H03J 7/06
[52] U.S. Cl. ........................................... 328/14; 331/2; 331/54; 331/48; 331/107 P; 364/786; 377/80
[58] Field of Search ...................... 328/155, 71, 55, 14; 364/484, 759, 768, 781, 405, 431.04; 331/1 A, 2, 48, 54, 107 P, 108 C, DIG. 3

[56] References Cited

U.S. PATENT DOCUMENTS

| | | | |
|---|---|---|---|
| 3,641,442 | 2/1972 | Boucher | 307/14 |
| 3,735,269 | 5/1973 | Jackson | 328/14 |
| 3,973,209 | 8/1976 | Nossen et al. | 328/14 |
| 4,052,604 | 10/1977 | Maitland et al. | 364/786 |
| 4,144,579 | 3/1979 | Nossen et al. | 364/607 |
| 4,185,247 | 1/1980 | Harrison, Jr. | 328/165 |
| 4,240,034 | 12/1980 | Lowenschuss | 328/14 |
| 4,241,308 | 12/1980 | Cellier et al. | 331/48 |

Primary Examiner—Stanley D. Miller
Assistant Examiner—Loha Ben
Attorney, Agent, or Firm—Lowell W. Gresham

[57] ABSTRACT

A radio frequency numerically controlled oscillator comprising N one bit adders each providing sum and carry outputs to one of N two bit registers. Sum, carry and frequency selection inputs are combined by each adder to form sum and carry outputs. These results are held by the associated register when triggered by a clock input. A fast parallel adder/latch is employed which has two stages connected serially to generate sums on opposite phases of a two phase clock.

8 Claims, 4 Drawing Figures

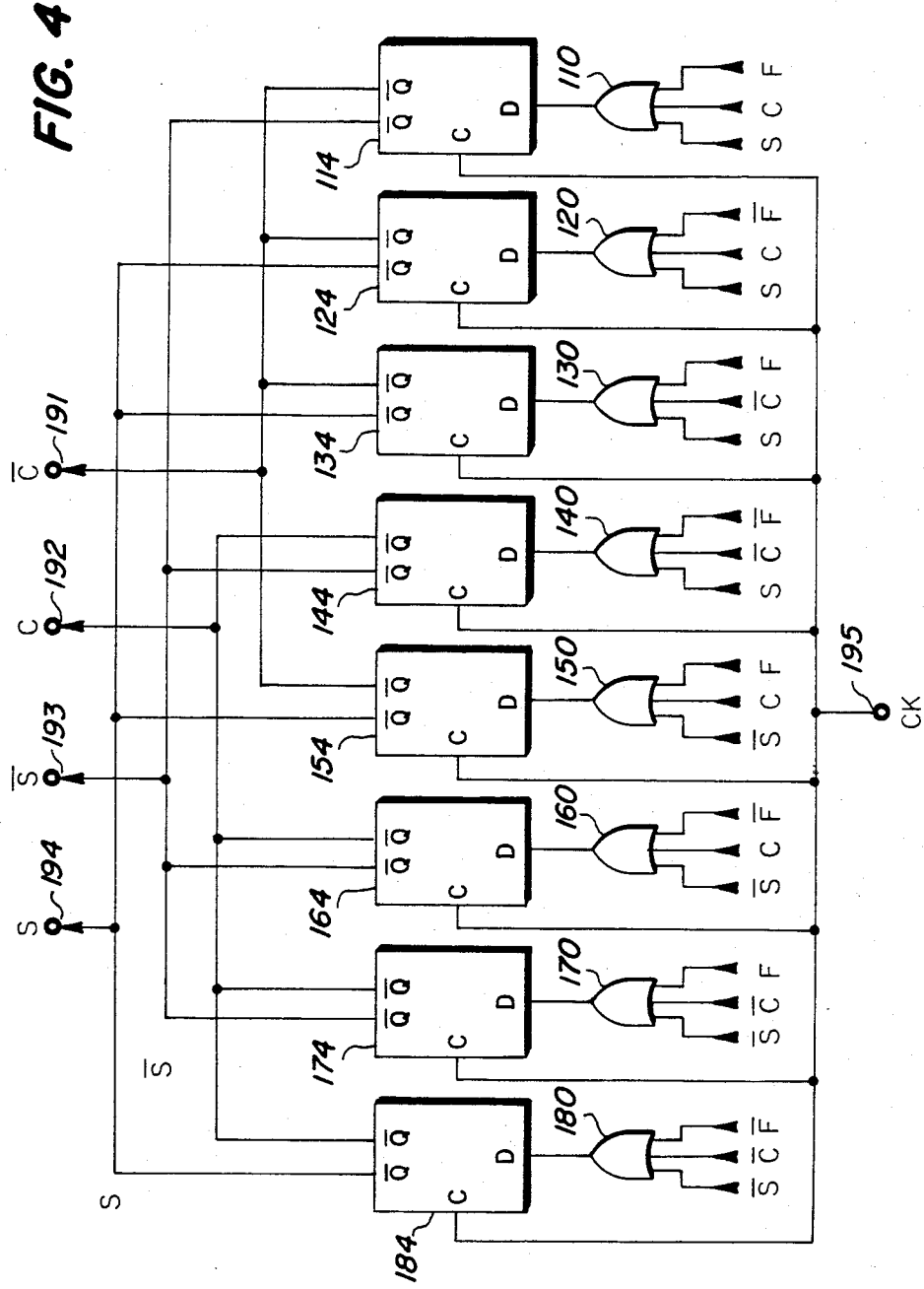

NUMERICALLY CONTROLLED OSCILLATOR

BACKGROUND OF THE INVENTION

The present invention pertains to numerically controlled oscillators and in particular to radio frequency numerically controlled oscillators.

Because an increasing number of communications systems transmit digitally encoded information, a need has developed for hardware capable of transmitting and receiving such information at radio frequencies. A particularly important piece of equipment in this regard is a RF generator which is stable, digitally programmable for control by a microprocessor and capable of operating at high frequency on the order of 500 mHz.

One approach to providing a numerically controlled oscillator (NCO) involves using a counter which increments with each pulse of a clock until a terminal value is reached, at which point the counter returns to zero and begins to counting up again. Such an NCO provides a gradually upward sloping level of output until the terminal value is reached at which point the output level rapidly returns to a base level so that a sawtoothed output signal is produced. Counters for NCOs generally include a plurality of adders. These adders may be connected in series or in parallel.

In one approach to providing a rapid NCO, a parallel arrangement of adders is employed in order to avoid delays associated with the need for a "carry" signal to ripple through a series of adders as is required for common structures using parallel addition. However, in order to ensure that the carry is proportional from a least to a most significant bit, the use of a large number of logic gates is required resulting in delays that make such NCOs unsuitable for operation at radio-frequencies.

SUMMARY OF THE INVENTION

Accordingly it is an object of the present invention to provide a new and improved numerically controlled oscillator.

It is a further object of the present invention to provide a new and improved fast parallel adder for use in a numerically controlled oscillator.

Yet a further object of the present invention is to provide a new and improved numerically controlled oscillator capable of operating at high radio frequencies.

Among the advantages of the present invention are the simplicity and inexpensiveness with which the present invention may be implemented. Another advantage of the present invention is that it is sufficiently uncomplicated to be implemented on a reasonably sized IC chip.

These and other objects and advantages of the present invention will become apparent to those skilled in the art upon consideration of the accompanying specification, claims and drawings.

In order to attain the above-mentioned and other objects and advantages, the present invention involves a numerically controlled oscillator. The numerically controlled oscillator comprises the plurality of adding units each itself comprising a one bit adder with a first, second and a third input and having a sum and a carry output. The third input of each adder is coupled to a means for providing an input indicative of a frequency. Each adding unit further comprises a register having a clock input, having a first input coupled to the sum output of the associated adder, having a second input coupled to the carry output of the associated adder, having a sum output coupled to the second input of the adder and having a carry output. The adding units are coupled in series with the first unit in the series having the second input of its adder tied to a source of a logic level signal and with each consecutive unit having the second input of its respective adder connected to a carry output of the register in a previous unit in a series. Means for providing an output are coupled to each of the sum outputs of each of the registers.

A fast parallel adder according to the present invention comprises a first stage having means for adding input signals with means for accepting a frequency input, with means for accepting a sum input and with means for accepting a carry input. The first stage also has means for storing the result of an addition with a clock input, with means for providing a sum output and with means for providing a carry output. The fast parallel adder further comprises a second stage having means for adding signals with means for accepting a frequency input, with means for accepting a sum input coupled to the means for providing a sum output of the first stage, and with means for accepting a carry input. The second stage also has means for storing the result of an addition with means for providing a sum output coupled to the means for accepting a sum input of the first stage and with means for providing a carry output. The clock input of the first stage is suitable for application of a first clock signal and the clock input of the second stage is suitable for application of a second clock signal out of phase with the first clock signal so that the result of an addition in the means for adding of the first stage is stored upon application of the first clock signal to the first stage and so that the result of an addition in the second stage is stored in the second stage upon application of the second clock signal to the second stage.

A numerically controlled oscillator capable of operating at radio frequencies, according to the present invention, comprises means for providing an input indicative of a frequency and a plurality of adding units, each adding unit having a first stage and a second stage. Each of the first stages has means for adding input signals with means for accepting a frequency input, with means for accepting a sum input, and with means for accepting a carry input. Each of first stages also has means for storing the result of an addition with a clock input, with means for providing a sum output, and with means for providing a carry output. Each of the second stages has means for adding input signals with means for accepting a frequency input, with means for accepting a sum input coupled to the means for providing a sum output of the first stage and with means for accepting a carry input. Each of said second stages also has means for storing the result of an addition with means for providing a sum output coupled to a means for accepting a sum input of the first stage and with means for providing a carry output. A clock input of the first stage is suitable for application of a first clock signal and the clock input of the second stage is suitable for application of a second clock signal out of phase with the first clock signal, so that the result of an addition in the means for adding the first stage is stored in the first stage upon application of the first clock signal to the first stage and so that the result of an addition in the second stage is stored in the second stage upon application of the second clock signal to the second stage. The adding units are coupled in a series with a first unit in the series having the carry input of the adder tied to a source of a logic level signal and with each consecutive unit having the second input of the adder coupled to the carry output of the register in a previous unit in the series. Means for providing an output are coupled to each of the sum outputs of the registers.

BRIEF DESCRIPTION OF THE DRAWINGS

FIG. 4 is a schematic of a fast adder stage for use in the parallel adder of FIG. 3.

DESCRIPTION OF THE PREFERRED EMBODIMENT

Figure 1:
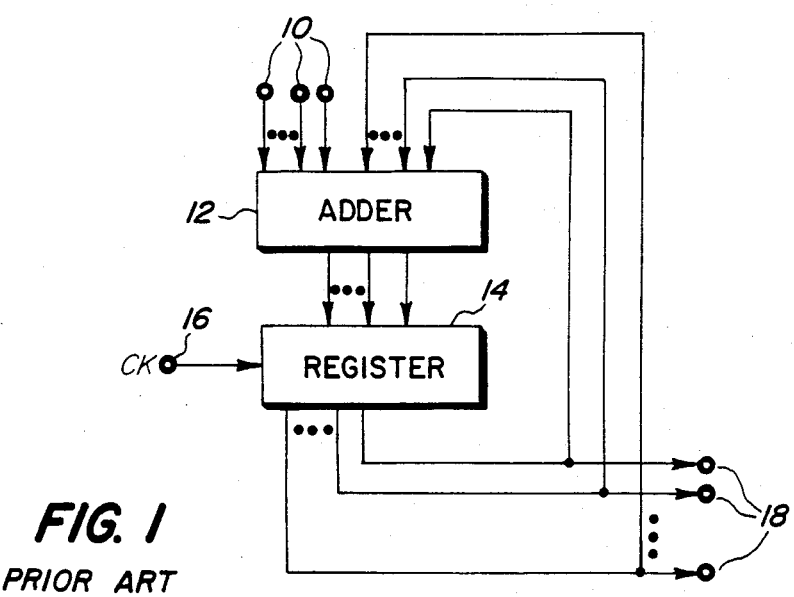
FIG. 1 is a block diagram of a prior art NCO.

In a prior art NCO as shown in FIG. 1, each of a plurality of terminals 10 suitable for application of digitally encoded frequency information, is coupled to an input of one of NCO stages of an N bit adder 12. Each of a plurality of outputs of adder 12 is coupled to a plurality of inputs of a register 14. Register 14 also has an input connected to a terminal 16 suitable for application of a clock pulse. Each of a plurality of outputs of N bit register 14 is coupled to one of a plurality of output terminals 18 and to one of a plurality of inputs of N bit parallel adder 12.

The prior art NCO consists of a parallel digital adder and register, each N bits wide. One input word to the adder is an N bit word indicative of a desired frequency called FREQ. The register is used to hold the result of the last addition. It is updated at a rate determined by pulses applied to terminal 16. Thus, the NCO is an accumulator that is incrementing at a rate determined by the frequency of the clock input and the magnitude of the FREQ digital word. These values are related by the equation, $$F_{OUTPUT} = F_{CK} \frac{FREQ}{2^N} \quad (1)$$

where:

$F_{OUTPUT}$ = the toggle rate of the most significant output bit at terminals 18, $F_{CK}$ = the frequency of the input clock applied to terminal 16, N = the bit capacity of adder 12, and FREQ = the numerical value of the input word FREQ, where $$0 \leq FREQ \leq 2^{N-1}. \quad (2)$$

Therefore, $$0 \leq F_{OUTPUT} \leq \frac{F_{CK}}{2} \quad (3)$$

in steps of $$\frac{F_{CK}}{2^N}.$$

The maximum possible clock frequency, $F_{CK}$, employable in this method of frequency synthesis is determined by the propagation delay associated with the addition and holding process. In parallel N bit addition, carry information must be propagated from the least significant to the most significant bit. Using serial carry propagation, this delay can be excessive when adding many bits. Carry look-ahead circuitry may be included to speed up the process at the expense of greater complexity. In addition, even a single bit adder and register combination, as normally implemented, is limited in speed to 4 or more gate propagation delays per addition. For example, a low-power Schottky TTL (LSTTL) circuit exhibits a typical gate propagation delay of 5 nanoseconds. An LSTTL adder and register combination requires a total time of about 25 nanoseconds in order to operate.

Figure 2:
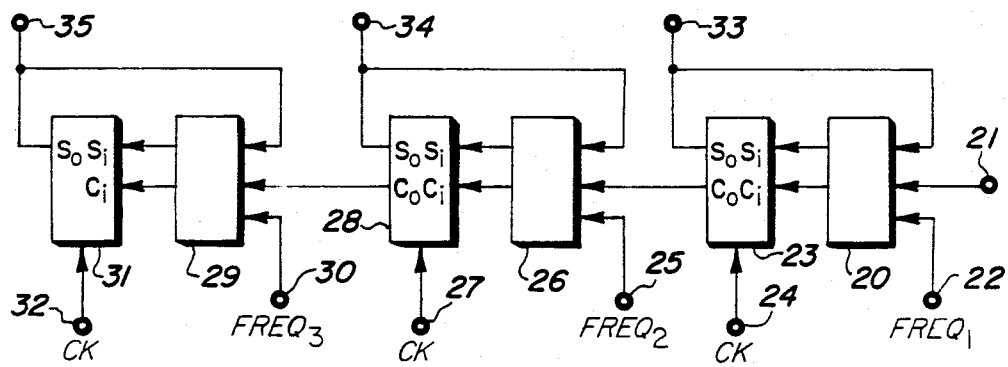
FIG. 2 is a block diagram of a numerically controlled oscillator according to the present invention.

A numerically controlled oscillator according to the present invention, as shown in FIG. 2, takes advantage of the fact that all bit results of the addition do not need to be generated in parallel. The sum and carry outputs from each individual bit are generated and held during each clock cycle. The resultant output of the most significant bit is similar to that which is obtained using a parallel addition scheme and equations (1) through (3) apply.

An embodiment of the present invention is depicted in FIG. 2 wherein N=3. A first one bit adder 20 has a first input, has a second input connected to a terminal 21 suitable for application of a logic level signal, and has a third input connected to a terminal 22 suitable for application of a first bit of a frequency word. A first two bit register 23 has a sum input $S_i$ connected to a sum output of adder 20, has a carry input $C_i$ connected to a carry output of adder 20, has a sum output $S_o$ coupled to the first input of adder 20, and has a clock input coupled to a terminal 24 suitable for application of a clock pulse.

A second one bit adder 26 has a first input, has a second input connected to the $C_o$ output of register 23 and has a third input connected to a terminal 25 suitable for application of a second bit of a frequency word. A second two bit register 28 has a sum input $S_i$ connected to a sum output of adder 26, has a carry input $C_i$ connected to a carry output of adder 26, has a sum output $S_o$ coupled to the first input of adder 26 and has a clock input coupled to a terminal 27 suitable for application of a clock pulse.

A third one bit adder 29 has a first input, has a second input connected to a carry output $C_o$ of register 28 and has a third input connected to a terminal 30 suitable for application of a third bit of a frequency word. A third register 31 has a sum input $S_i$ coupled to a sum output of adder 29, has a carry input $C_i$ connected to a carry output of adder 29, has a clock input connected to a terminal 32 suitable for application of a clock pulse and has a sum output $S_o$ connected to the first input of adder 29.

The $S_o$ output of register 23 is connected to a terminal 33 suitable for output of a first bit of an output word. Likewise, the $S_o$ output of register 28 is connected to a terminal 34 suitable for transmission of a second bit of an output word. Finally, the $S_o$ output of register 31 is connected to a terminal 35 suitable for transmission of a third bit of an output word.

As shown in FIG. 2 the numerically controlled oscillator according to the present invention consists of 3 one bit adders and 3 two bit registers. Sum, carry, and input data are combined by each adder to form sum and carry outputs. These results are held by the associated register when triggered by its clock input. Thus, 3 individual single bit sums are generated during every clock period. Table 1 illustrates the case where the frequency word is 011, the maximum frequency word under the condition of equation (2), i.e. that $0 \leq FREQ \leq 2^{3-1}$, so that FREQ has a maximum value of 3.

TABLE 1

| Number of Clock Pulses | Register 23 | | Register 28 | | Register 31 |
|---|---|---|---|---|---|
| | $S_o$ | $C_o$ | $S_o$ | $C_o$ | $S_o$ |
| 1 | 1 | 0 | 1 | 0 | 1 |
| 2 | 0 | 1 | 0 | 1 | 1 |
| 3 | 1 | 0 | 0 | 1 | 0 |
| 4 | 0 | 1 | 1 | 0 | 1 |
| 5 | 1 | 0 | 1 | 1 | 1 |
| 6 | 0 | 1 | 0 | 1 | 0 |
| 7 | 1 | 0 | 0 | 1 | 1 |
| 8 | 0 | 1 | 1 | 0 | 0 |
| 9 | 1 | 0 | 1 | 1 | 0 |
| 10 | 0 | 1 | 0 | 1 | 1 |
| 11 | 1 | 0 | 0 | 1 | 0 |
| 12 | 0 | 1 | 1 | 0 | 1 |

As is clear to one skilled in the art upon examination of Table 1, for the eight clock pulses 2-9, there are three peaks in the $S_o$ output of register 31, at clock pulses 2, 4 and 5, and 7 corresponding to a frequency of 3 output peaks per 8 clock pulses as entered in the form of the FREQ word. The use of an odd FREQ word, as in the example of Table 1, leads to the production of spurious peaks in the frequency spectrum. These spurious peaks can be reduced with respect to the primary peak, by introducing a frequency divider in the output of the oscillator at the expense of reducing the output frequency. For example, it is calculated that a divide-by-10 frequency divider reduces spurious peaks by 20 dB with respect to the primary.

As is obvious to one skilled in the art, a numerically controlled oscillator according to the present invention is not limited to a combination of 3 one bit adders and 3 two bit registers but rather may have any number of adders and registers suitable for a particular application.

Embodiment of FIG. 2 allows the use of faster, more simplified circuit elements than do prior art NCOs. It also allows the number of bits of the NCO to be increased without lowering the maximum clock frequency. However, the output of the NCO according to the present invention does not respond instantly to a change in the frequency word as does the prior art NCO of FIG. 1. Nevertheless, the delay is not appreciable for most applications. For example, when using a 20 bit NCO with a clock frequency of 100 MHz the total update time from input to a new stable output signal is calculated to be $N/F_{CK}$, or 200 nanoseconds.

In order to further increase the speed of the addition and holding process, the numerically controlled oscillator according to the present invention uses a fast parallel addition technique. This technique uses two identical adder/latch stages connected serially to generate sums on opposite phases of a two phase clock.

Figure 3:
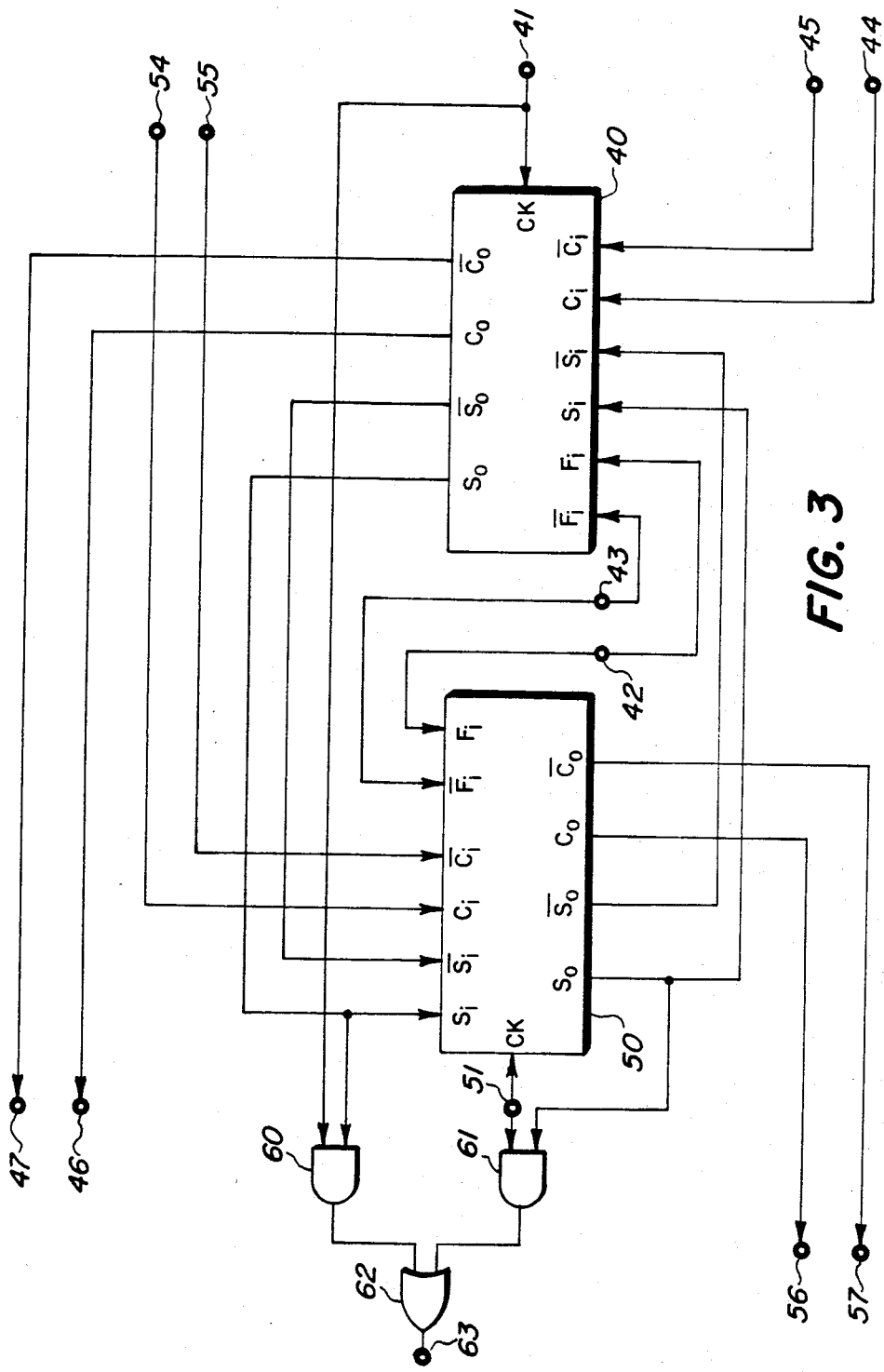
FIG. 3 is a block diagram of a fast parallel adder according to the present invention.

Turning now to FIG. 3, a first stage 40 has a clock input connected to a terminal 41 suitable for application of a first clock signal, has a frequency input $F_i$ connected to a terminal 42 suitable for application of a bit of a frequency word and has a frequency complement input $\overline{F}_i$ connected to a terminal 43 suitable for application of a frequency complement input. Stage 40 also has a carry input $C_i$ connected to a terminal 44 suitable for application of a carry input, has a carry complement input $\overline{C}_i$ connected to a terminal 45 suitable for application of a carry complement input, has a sum input $S_i$ and has a sum complement input $\overline{S}_i$. In addition, stage 40 has a sum output $S_o$, a sum complement output $\overline{S}_o$, a carry output $C_o$ connected to a terminal 46 suitable for transmission of a carry output and a carry complement output $\overline{C}_o$ connected to a terminal 47 suitable for transmission of a carry complement output.

A second stage 50 has a clock input connected to a terminal 51 suitable for application of a second clock signal, has a frequency input $F_i$ connected to terminal 42 and has a frequency complement input $\overline{F}_i$ connected to terminal 43. Stage 50 also has a sum input $\overline{S}_i$ connected to the sum output of stage 40 and to a first input of a first AND gate 60, has a sum complement input $S_i$ connected to the $\overline{S}_o$ output of stage 40, has a carry input $C_i$ connected to a terminal 54 suitable for application of a carry input and has a carry complement input $\overline{C}_i$ connected to a terminal 55 suitable for application of a carry complement input. In addition, stage 50 has a sum output $S_o$ connected to input $S_i$ of stage 40 and to a first input of a second AND gate 61, has a sum complement output $\overline{S}_o$ connected to input $\overline{S}_o$ and 3; of stage 40, has a carry output $C_o$ connected to a terminal 56 suitable for application of a carry output and has a carry complement output $\overline{C}_o$ connected to a terminal 57 suitable for application of a carry complement output.

A second input of first AND gate 60 is connected to terminal 41. An output of AND gate 60 is connected to a first input of an OR gate 62, an output of which is connected to a terminal 63 suitable for transmission of an adding unit sum output signal. A second input of second AND gate 61 is connected to terminal 51. An output of AND gate 61 is connected to a second input of OR gate 62.

Terminals 44 and 45 and 54 and 55 may be connected to a carry and a carry complement output of a first stage and a carry and a carry complement output of a second stage of another adder in a series, or may be terminated if the adder of FIG. 3 is to serve as a first adder in a series. Similarly, terminals 46 and 47 and terminals 56 and 57 may be connected to the carry and the carry complement input of a second stage and carry and a carry complement input of a first stage of a subsequent adder in a series or, if the adder of FIG. 3 is to serve as a last adder in a series, may be terminated.

In the embodiment of FIG. 3, the output of one stage of the adder holds while the other adds. Preferably, 50% duty clock pulses 180° out of phase are applied alternately to terminal 41 and then to terminal 51.

A fast adder stage, as shown in FIG. 4, may be used to implement any stage of an adder according to the present invention. In the adder stage of FIG. 4, the sum and carry results of an addition are logical sums of products of the three input functions, SCF, and of their complements, $\overline{S}, \overline{C}, \overline{F}$. The three functions, in this case, are a previous sum, a carry in from a previous stage, and a frequency bit. By independently generating and holding all 8 products simultaneously, the appropriate outputs are summed by a "wired OR" process to form a sum or carry in one latch delay time.

As shown in FIG. 4, a first OR gate 110 has an S input, has a C input, and has an F input. An output of OR gate 110 is connected to a D input of a first latch 114, a $\overline{Q}$ output of which is connected to a terminal 191 suitable for transmission of $\overline{C}$ output and to a terminal 193 suitable for transmission of an $\overline{S}$ output. A second OR gate 120 has an S input, has a C input, has an $\overline{F}$ input, and has an output connected to a D input of a second latch 124. A $\overline{Q}$ output of latch 124 is connected to terminal 191 and to a terminal 194 suitable for transmission of an S output.

A third OR gate 130 has an S input, $\overline{C}$ input and has an F input. A D input of third latch 134 is connected to an output of OR gate 130 while a e,ovs/Q/ output of latch 134 is connected to terminal 191 and to terminal 194.

A fourth OR gate 140 has an S input, has a $\overline{C}$ input, has an $\overline{F}$ input and has an output connected to a D input of a fourth latch 144. A $\overline{Q}$ output of latch 144 is connected to a terminal 192 suitable for transmission of a C output and to a terminal 193.

A fifth OR gate 150 has an $\overline{S}$ input, and C input, an F input and has an output connected to a D input of a fifth latch 154, a $\overline{Q}$ output of which is connected to terminal 191 and to terminal 194. A sixth OR gate 160 has an $\overline{S}$ input, has a C input and has an $\overline{F}$ input. A sixth latch 164 has a D input connected to an output of OR gate 160 and has a $\overline{Q}$ output connected to terminal 192 and to terminal 193.

A seventh OR gate 170 has an $\overline{S}$ input, has a $\overline{C}$ input and has an F input. A seventh latch has a D input connected to an output of OR gate 170. Latch 174 also has a $\overline{Q}$ output connected to terminal 192 and to terminal 193.

An eighth OR gate 180 has an $\overline{S}$ input, has a $\overline{C}$ input, has an $\overline{F}$ input and has an output connected to a D input of an eighth latch 184. A $\overline{Q}$ output of latch 184 is connected to terminal 192 and to terminal 194.

Each of latches 114, 124, 134, 144, 154, 164, 174, and 184 has a clock input connected to a terminal 195 suitable for application of a clock pulse.

Latches 114, 124, 134, 144, 154, 164, 174 and 184 may be implemented by the use of type-D flip-flops which are well known and readily available to those skilled in the art. OR gates, such as gates 110, 120, 130, 140, 150, 160, 170 and 180 are also well known and readily available to those skilled in the art and will not be discussed further.

Each combination of an OR gate and a latch in FIG. 4 acts as a gated AND gate so that either terminal 194 or terminal 193 may receive a high level output but not both and so that either terminal 192 or terminal 191 may receive a high level output but not both. Examples of combinations of inputs and outputs for the fast adder stage of FIG. 4 are provided in Table 2.

TABLE 2

| Inputs<br>$S\overline{S}C\overline{C}F\overline{F}$ | Outputs<br>$S\overline{S}C\overline{C}$ | Numbers of<br>Latch with<br>High $\overline{Q}$ Output |
|---|---|---|
| 010110 | 1001 | 2 |
| 100110 | 1110 | 6 |
| 010101 | 0101 | 1 |
| 101010 | 1010 | 8 |

Due to fan-out and speed considerations, ECL is a preferred logic family to implement the radio frequency numerically controlled oscillator according to the present invention. Present technology allows construction of a 12 bit NCO capable of being clocked at 500 MHz on a single integrated circuit. Further technological enhancements already announced should double the size and speed of radio frequency numerically controlled oscillators.

While the present invention has been described in terms of a preferred embodiment, further modifications and improvements will occur to those skilled in the art. I desire it to be understood, therefore, that this invention is not limited to the particular form shown and that I intend in the appended claims to cover all such equivalent variations which come within the scope of the invention as claimed.

I claim:

1. A numerically controlled oscillator comprising:
   means for providing an input indicative of a frequency;
   a plurality of adding units, each adding unit comprising a one bit adder having a first input, having a second input, and having a third input, said third input being coupled to said means for providing an input indicative of a frequency, having a sum output, and having a carry output and a register having a clock input, having a first input coupled to said sum output of said adder, having a second input coupled to said carry output of said adder, having a sum output coupled to said first input of said adder and having a carry output;
   said adding units being coupled in series with a first unit in said series having said second input of said adder tied to a source of a logic level signal and with each consecutive unit having a second input of an adder coupled to a carry output of a register in a previous unit in said series; and
   means for providing an output coupled to each of said sum outputs of each of said registers.

2. The numerically controlled oscillator as recited in claim 1 wherein each of said adders comprises a plurality of logic gates, and said means for storing comprises a plurality of latches, each latch being coupled to at least one of said logic gates, each latch having an output, means for logically combining said outputs of said latches to provide said sum output and said carry complement output of said register.

3. A fast parallel adder comprising:
   a first stage having means for adding input signals with means for accepting a frequency input, with means for accepting a sum input, and with means for accepting a carry input, and having means for storing the result of an addition with a clock input, with means for providing a sum output and with means for providing a carry output; and
   a second stage having means for adding inputs signals with means for accepting a frequency input, with means for accepting a sum input coupled to said means for providing a sum output of said first stage, with means for accepting a carry input, and having means for storing the result of an addition with means for providing a sum output coupled to said means for accepting a sum input of said first stage and with means for providing a carry output,
   said clock input of said first stage being suitable for application of a first clock signal and said clock input of said second stage being suitable for application of a second clock signal out of phase with said first clock signal so that the result of an addition in said means for adding of said first stage is stored upon application of said first clock signal tp said first stage and so that the result of an addition in said second stage is stored upon application of said second clock signal to said second stage.

4. The fast parallel adder, as recited in claim 3 wherein in said first stage said means for accepting a frequency input comprises a frequency input and a frequency complement input, said means for accepting a sum input comprises a sum input and a sum complement input, said means for accepting a carry input comprises a carry input and a carry complement input, said means for providing a sum output comprises a sum output and a sum complement output, and said means for providing a carry output comprises a carry output and a carry complement output; and wherein in said second stage said means for accepting a frequency input comprises a frequency input and a frequency complement input, said means for accepting a sum input comprises a sum input and a sum complement input, said means for accepting a carry input comprises a carry input and a carry complement input, said means for providing a sum output comprises a sum output and a sum complement output, and said means for providing a carry output comprises a carry output and a carry complement output.

5. The fast parallel adder as recited in claim 4 wherein said means for adding of said first stage comprises a plurality of logic gates wherein said means for storing comprises a plurality of latches, each latch being coupled to at least one of said logic gates, each latch having an output means for logically combining said outputs of said latches to provide said sum output, said sum complement output, said carry output and said carry complement output of said first stage; and wherein said means for adding of said second stage comprises a plurality of logical gates; and wherein said means for storing comprises a plurality of latches, each latch being coupled to at least one of said logic gates, each latch having an output, means for logically combining said outputs of said latches to provide said sum output said sum complement output, said carry output and said carry complement output of said stage.

6. A numerically controlled oscillator capable of operating at radio frequencies comprising:

means for providing an input indicative of a frequency;

a plurality of registers;

a plurality of adding units, each adding unit having a first stage and a second stage, each of said first stages having means for adding input signals with means for accepting a frequency input, with means for accepting a sum input, and with means for accepting a carry input, and having means for storing the result of an addition with a clock input, with means for providing a sum output and with means for providing a carry output;

each of said second stages having means for adding input signals with means for accepting a frequency input, with means for accepting a sum input coupled to said means for providing a sum output of said first stage, and with means for accepting a carry input, and having means for storing the result of an addition with a clock input, with means for providing a sum output coupled to said means for accepting a sum input of said first stage, and with means for providing a carry output;

said clock input of said first stage being suitable for application of a first clock signal and said clock input of said second stage being suitable for application of a second clock signal out of phase with said first clock signal so that the result of an addition in said means for adding of said first stage is stored upon application of a first clock signal to said first stage and so that the result of an addition in said means for adding of said second stage is stored upon application of said second clock signal to said second stage;

said adding units each being coupled to a register and the combination being coupled in series, with a first unit in said series having said carry input of said adder coupled to a source of a logic level signal and with each consecutive unit having a second input of an adder coupled to a carry output of a register in a previous unit in said series; and means for providing an output coupled to each of said sum outputs of each of said registers.

7. The numerically controlled oscillator as recited in claim 6 wherein in said first stage said means for accepting a frequency input comprises a frequency input and a frequency complement input, wherein said means for accepting a sum input comprises a sum input and a sum complement input, wherein said means for accepting a carry input comprises a carry input and a carry complement input, wherein said means for providing a sum output comprises a sum output and a sum complement output, and wherein said means for providing a carry output comprises a carry output and a carry complement output; and wherein in said means for adding of said second stage said means for accepting a frequency input comprises a frequency input and a frequency complement input, wherein said means for accepting a sum input comprises a sum input and a sum complement input, wherein said means for accepting a carry input comprises a carry input and a carry complement input, wherein said means for providing a sum output comprises a sum output and a sum complement output, and wherein said means for providing a carry output comprise a carry output and a carry complement output.

8. The numerically controlled oscillator as recited in claim 7 wherein said means for adding of said first stage comprises a plurality of logic gates, wherein said means for storing comprises a plurality of latches, each latch coupled to at least one of said logic gates, each latch having an output, means for logically combining said outputs of said latches to provide said sum output, said sum complement out, said carry output and said carry complement output of said first stage; and wherein said means for adding of said second stage comprises a plurality of logic gates, and wherein said means for storing comprises a plurality of latches, each latch being coupled to at least one of said logic gates, each latch having an output, means for logically combining said outputs of said latches to provide said sum output, said sum complement output, said carry output and said carry complement output of said second stage.

* * * * *